April 14, 1953      E. R. GOSSE      2,634,872
VEHICLE UNLOADING FEEDING CONVEYER
Filed Aug. 21, 1948      5 Sheets-Sheet 3
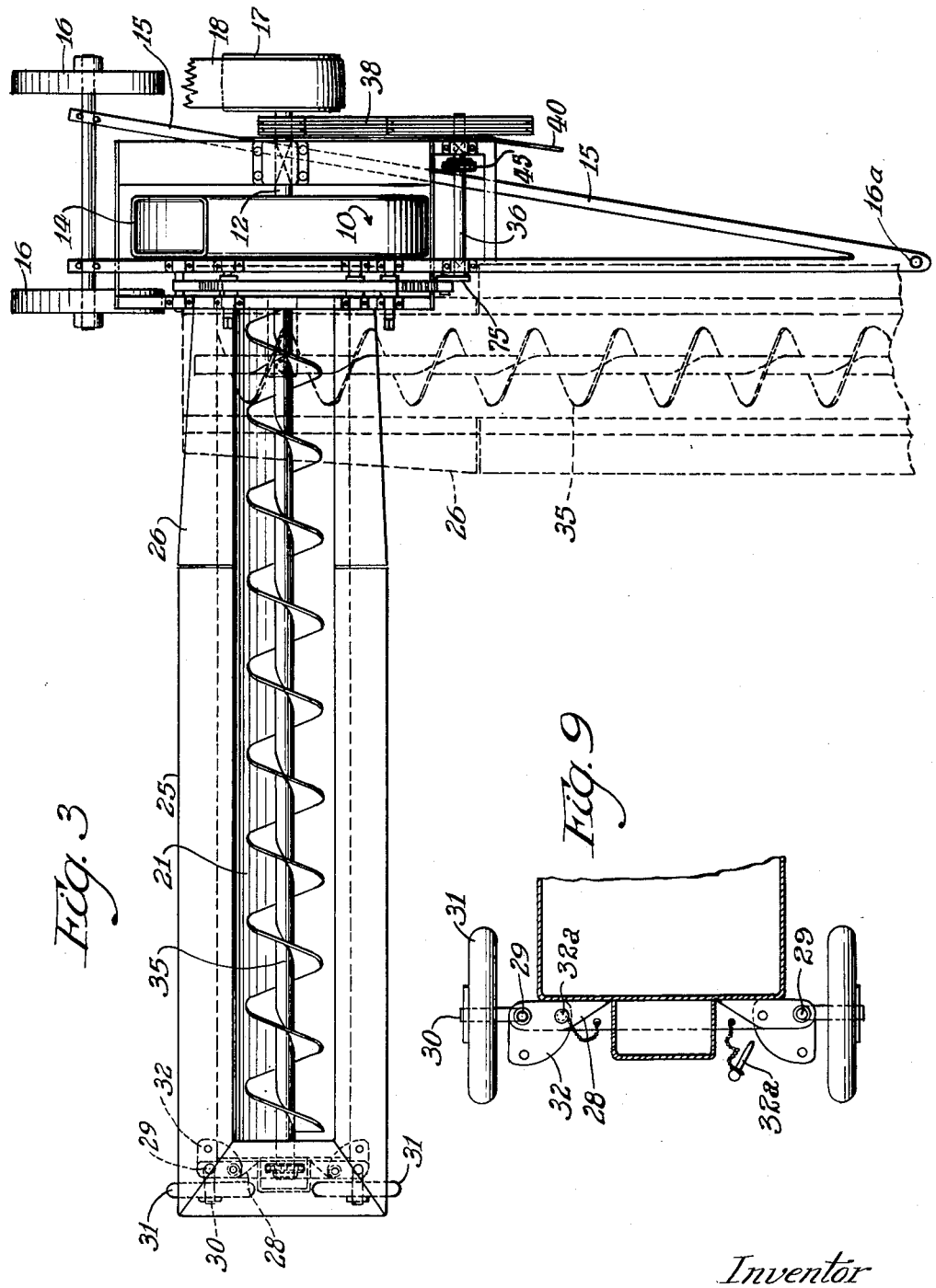
Inventor
Earl R. Gosse
By Wheeler, Wheeler & Wheeler Attys.

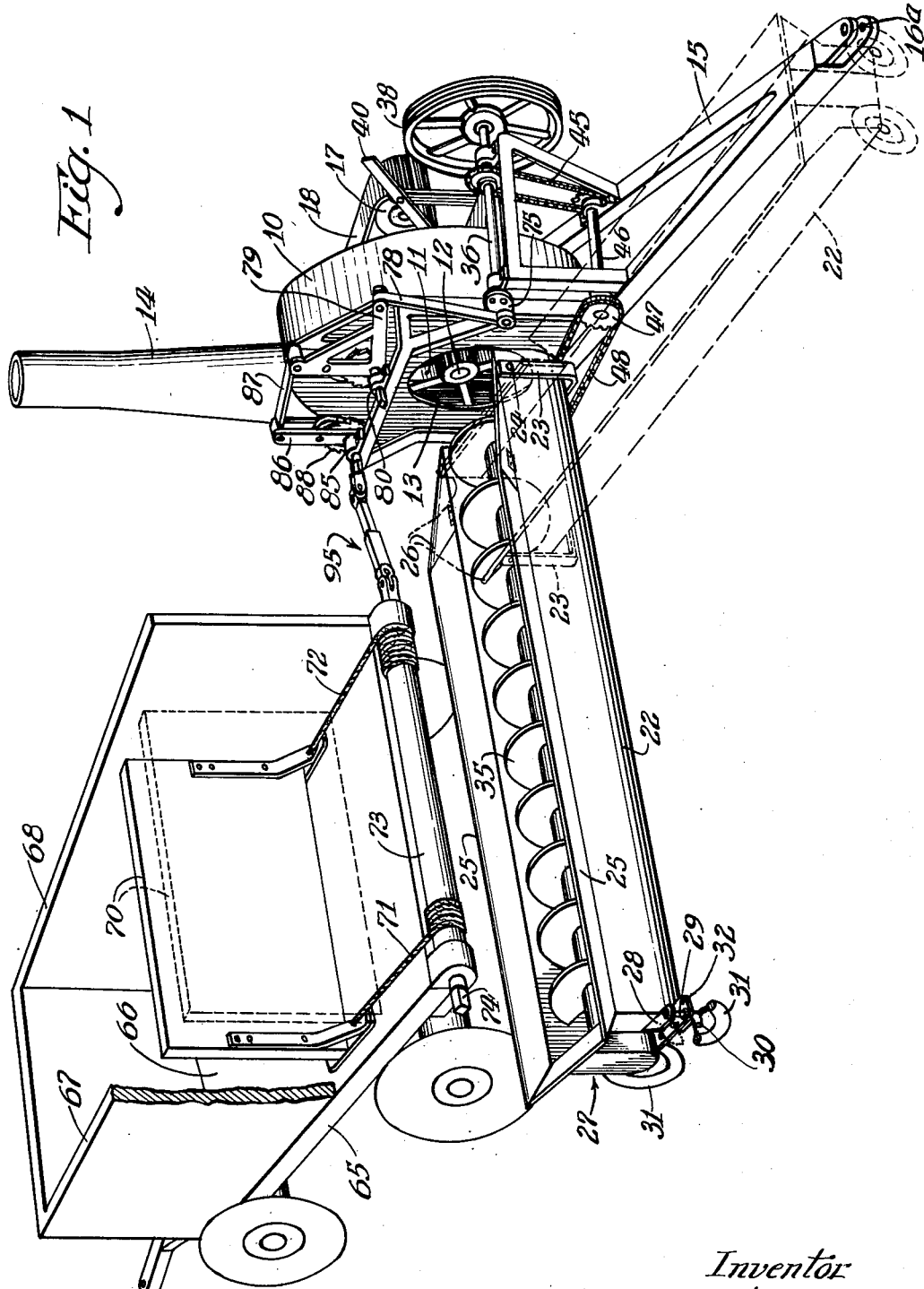

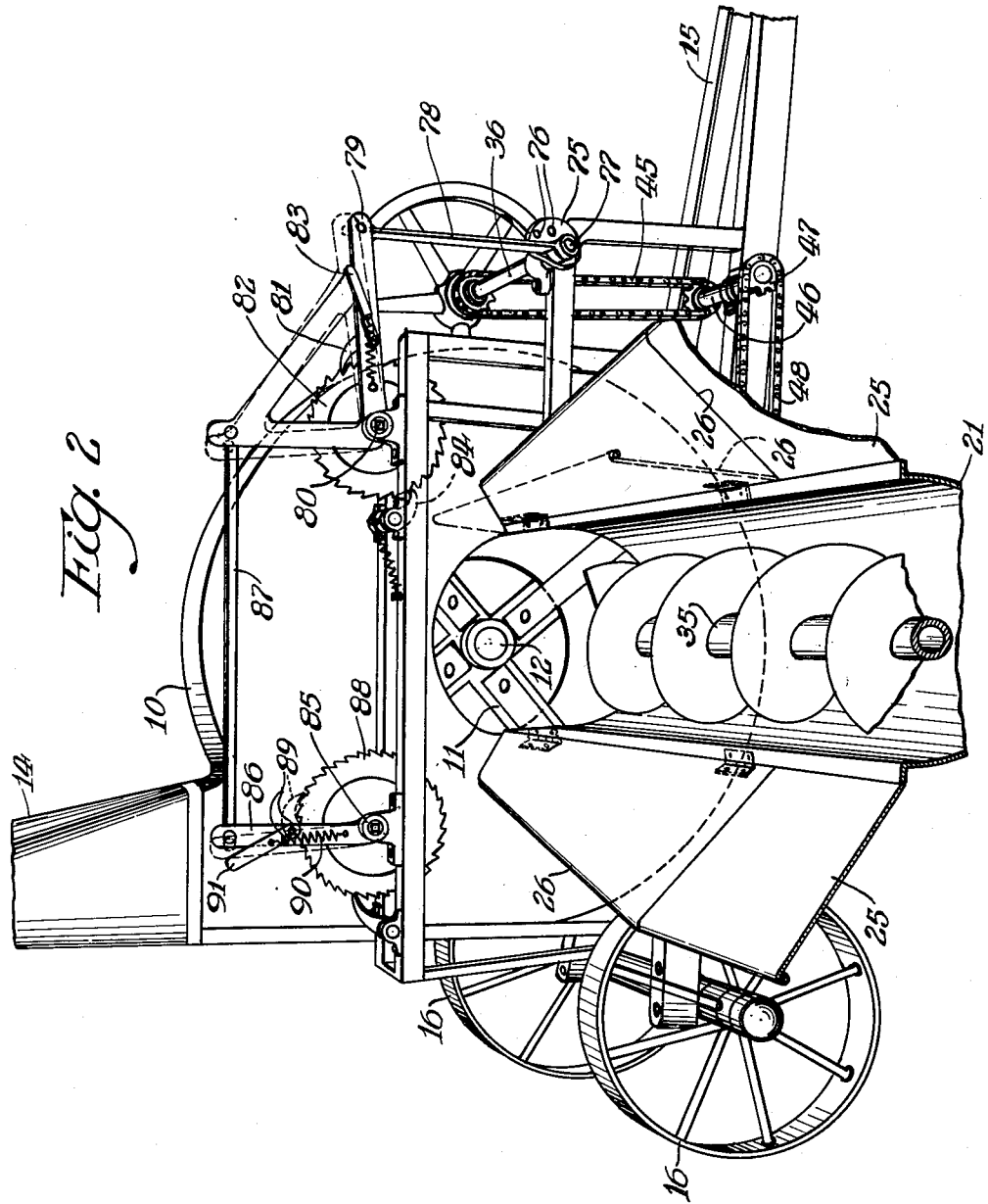

April 14, 1953          E. R. GOSSE          2,634,872
VEHICLE UNLOADING FEEDING CONVEYER
Filed Aug. 21, 1948          5 Sheets-Sheet 4
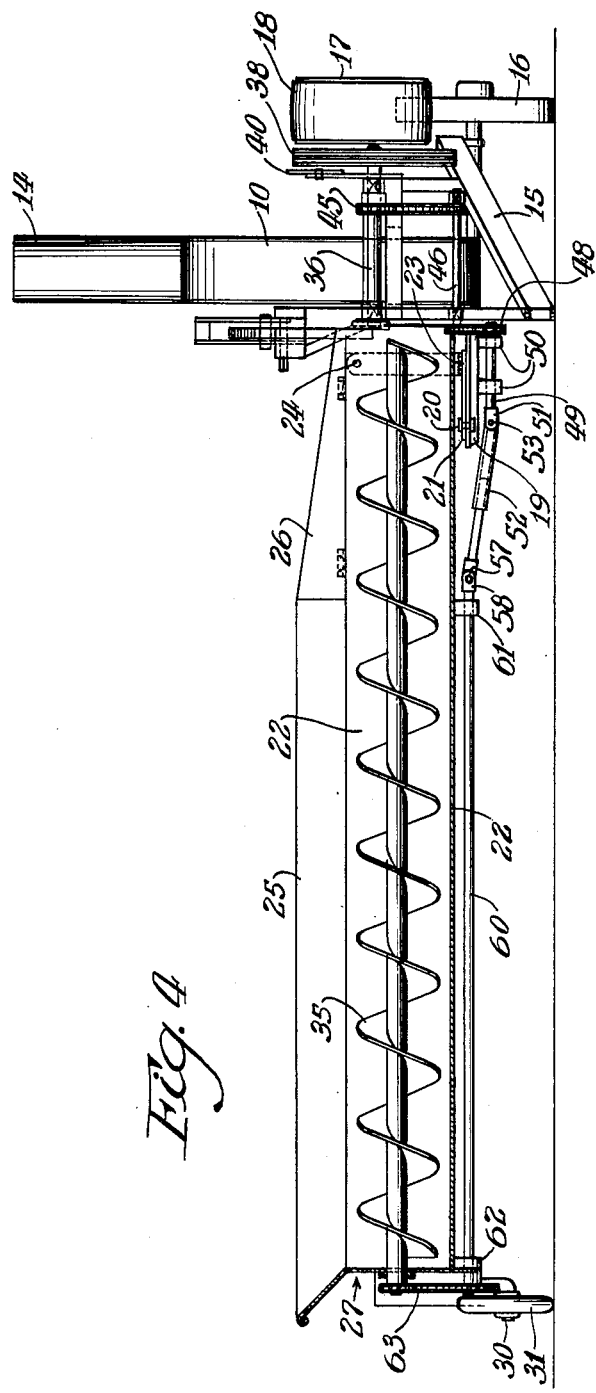
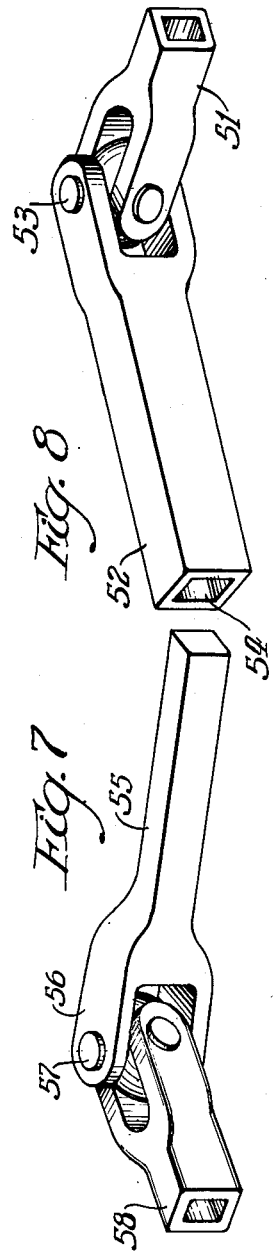
Inventor
Earl R. Gosse
By Wheeler, Wheeler + Wheeler Attys.

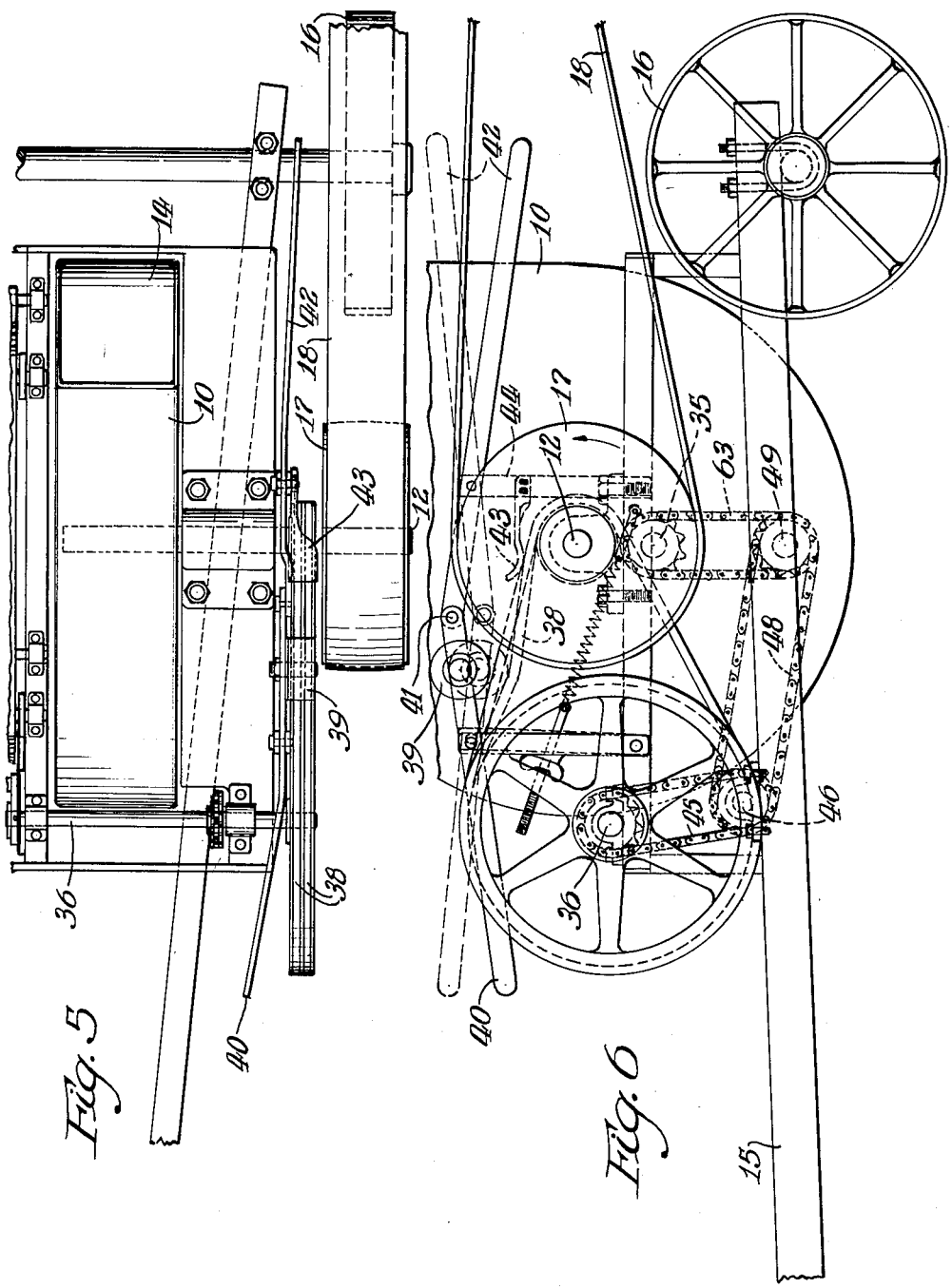

Patented Apr. 14, 1953

2,634,872

UNITED STATES PATENT OFFICE 2,634,872

VEHICLE UNLOADING FEEDING CONVEYER

Earl R. Gosse, Seymour, Wis.

Application August 21, 1948, Serial No. 45,514

10 Claims. (Cl. 214—44)

This invention relates to a vehicle unloading feeding conveyor.

It is a primary object of the invention to provide a novel and improved type of conveying mechanism including a drive for a self-unloading vehicle and a screw conveyor which receives the material and feeds the blower of pneumatic conveyor system. It is a further important object to provide an adjustment for the screw conveyor trough whereby it may be swung out of the way to allow the vehicle to progress in a forward direction into unloading position. The vehicle may progress in either direction to unloading position, this result being achieved without in any manner interfering with the blower or its driving connections from a tractor or other engine.

It is very difficult, particularly for an unskilled operator, to back a vehicle such as a trailer or truck into unloading proximity to a transverse conveyor without endangering the conveyor. An upwardly swinging conveyor does not let the vehicle approach sufficiently closely to the blower. In the use of the present invention, the conveyor is simply swung horizontally out of the way until the vehicle is driven forwardly into place, whereupon the conveyor is swung into operating position behind the vehicle and the unloading immediately progresses.

In this connection it is a further important object of the invention to provide a construction facilitating the conveyor adjustment with a drive so flexible that it is not in any manner interfered with by the movement of the conveyor to and from operative position. To this end, the drive is preferably carried lengthwise of the conveyor to its free or outer end remote from the blower and the conveyor screw is driven from that end, its inner end adjacent the conveyor being floating and having no connection which would impede the free delivery of material from the conveyor trough directly into the blower admission port.

The invention has particular utility when used with self-unloading vehicles of the type which are equipped with followers for discharging their contents progressively to the rear end. For such a vehicle my device is provided with means for automatically operating the follower for the discharge of the contents regardless of the direction in which the vehicle is facing when in unloading position.

There are many specific objects of the invention including the provision of a trough mounting for enabling it to swing in immediate proximity to the housing of the fan of the blower; the provision of wheels for the remote end of the conveyor trough which are adjustable to various positions, such wheels serving to support the free end of the trough during its pivotal movement to and from operative position and being also adjustable to serve as supporting wheels to enable the trough to trail beside the blower when the blower is being transported from one point to another; to provide a simple and adjustable operating means for effecting operation of the unloading mechanisms of the vehicle regardless of the direction in which the vehicle is facing and for operating it at differing speeds according to the work being handled; to provide a conveyor trough having side or hopper portions which are automatically foldable to enable the trough to lie more closely to the housing of the blower; and to provide a novel driving connection which also functions as a clutch to enable the device to be started and stopped from operator positions at either side thereof.

Still other objects of the invention will be more apparent from the following disclosure.

In the drawings:

Figure 1 is a view in perspective showing an unloading device in operative proximity to a vehicle, portions of which are broken away in section to expose the follower which is manipulated across the bed of the vehicle to discharge its contents into the trough of my unloading conveyor.

Figure 2 is a fragmentary detailed view in perspective looking lengthwise of the trough of the conveyor toward the eye of the lower casing.

Figure 3 is a view in plan of my apparatus as it appears when assembled, also showing in broken lines the position of the conveyor trough when it is folded against the blower housing.

Figure 4 is a view in longitudinal section through the conveyor trough, adjacent portions of the blower housing being shown in side elevation.

Figure 5 is an enlarged detailed view in plan of the conveyor housing and adjacent portions of the driving connections.

Figure 6 is a view in rear elevation of the driving connections behind the blower housing.

Figures 7 and 8 are enlarged detail views in perspective of component parts of the universally jointed and relatively expansible portions of the driving connections along the conveyor housing to the free end thereof for the actuation of the conveyor screw.

Figure 9 is a fragmentary detail view in horizontal section of a portion of the end of the housing shown in Fig. 3 to illustrate a different adjustment of the supporting wheels at the free end of the housing.

The ensilage blower portion of my conveying apparatus is essentially conventional, comprising a blower casing 10 within which there is a runner or fan 11 mounted on shaft 12. The casing has an inlet opening or eye 13 at or near the axis of shaft 12 and it has a tangential delivery spout at 14, which, as illustrated, may be upwardly directed.

The blower is mounted upon a trailer frame 15 which has a towing coupling at 16ª (Fig. 1), the rear end of the frame being supported on wheels 16ª to facilitate its transportation from point to point.

The extended blower shaft 12 carries a pulley 17 adapted to receive motion by means of belt 18 from any suitable source of power such as the power take off of a tractor or the like. It is important to the invention that the feed trough hereinafter to be described is horizontally adjustable in either direction with respect to the blower casing without in any manner interfering with the driving connections to the blower.

Projecting laterally from the frame 15 upon which the blower housing 10 is mounted, is a bracket at 19 which is provided at 20 with a fulcrum pin located at a level below the projected axis of the blower fan shaft 12. Pivoted upon the pintle 20 is a swivel plate 21, lying beneath the delivery end of the screw conveyor trough 22. The feed trough 22 has its delivery end aligned with, and in operative, work delivering proximity to, the admission port or eye 13 of the blower housing 10. The swivel plate 22 carries a yoke 23 having upstanding arms at each side of the trough to which the sides of the trough are pivoted at 24. Thus, the trough is free for upward and downward movements at its outer free end upon the horizontal transverse axis of pivot pins 24, as well as for oscillation horizontally about the vertical axis of pintle 20. Its range of horizontal movement is such that from its normal feeding position, shown in full lines in Fig. 3, it may be swung 90° in either lateral direction into parallelism with the frame 15.

The conveyor trough 22 is generally semi-tubular in cross section as indicated in Figures 1 and 2. Its sides are flared at 25 to constitue a hopper. They have wing-like extensions at 26 at the end next to the blower housing which are hinged to the conveyor trough proper so as to be yieldable in the manner indicated in Figures 1 and 2 so that when the conveyor is swung to one side, in the manner indicated in Fig. 1, these wings will yield so as not to interfere with the movement of the conveyor trough into close proximity to the blower housing.

At its free end 27 (Fig. 1) the trough 22 is provided with brackets 28 at each side. These brackets carry rotatably adjustable upright rods 29 having at their lower ends laterally projecting shafts 30 upon which the wheels 31 are mounted. Connected with the rods to turn therewith in the course of their angular adjustment are the generally triangular plates 32 (Fig. 3 and Fig. 9) provided with apertures which, in the selected positions of the wheels shown in Fig. 3 and Fig. 9, may respectively be registered with corresponding apertures in the respective brackets as shown in Fig. 1. By simply dropping a pin in the registering apertures of the plates 32 and brackets 28, it is possible to lock the wheels either in the position of Fig. 3 where they are arranged transversely respecting the trough or to lock them in the position shown in Fig. 9 where they are parallel with each other and with the longitudinal center line of the trough. In the position shown in Fig. 3 the wheels support the trough for swinging movement about the pivot provided by the pintle 20 upon which the trough swings bodily as shown in Fig. 3 and described above. When the wheels are turned to the position shown in Fig. 9, the trough being in a position opposite that shown in Fig. 3, where it trails beside the blower frame 15, the trough may be transported, along with the blower housing, by simply connecting any towing vehicle to the coupling 16ª at the forward end of such frame.

Any driving connection to the screw 35 which extends longitudinally through the feed trough 22, would be very much in the way if located at the end of said screw which is adjacent the point of delivery to the eye of the blower housing 10. Accordingly, the driving connections are extended to the outer end of the trough in the manner now to be described.

As best shown in Figures 1, 3, 5 and 6, the primarily driven blower shaft 12 which carries the drive pulley 17, together with the jack shaft 36 mounted from the frame 15 are both provided with multiple sheaves for a set of multiple V-belts 38. These belts are left quite slack and may be engaged or disengaged as desired by means of a tensioning pulley 39 mounted on a handle lever 40 which is pivoted at 41 to another handle lever at 42, the two levers comprising a toggle joint movable between the two positions indicated in full and dotted lines in Figure 6. In the full line position shown in Fig. 6 the pulley 39 is retracted and the belt 38 is slack thereby relieving the sheave of shaft 36 from being driven from shaft 12, which will continue in operation. I have found that a slight amount of tension applied at the right point on the V-belts just beyond where they leave the sheave will tend to cause them to be more slack at the driving sheave and accordingly I provide a shoe 43 mounted by means of bracket 44 from the housing of the fan, which engages the belts only when tightener pulley 39 is disengaged. The shoe causes the belts to ride free around the sheave of drive shaft 12 when the tension pulley 39 is disengaged. The provision of two separate handles, either one of which is capable of oscillating the retension pulley 39 to and from engagement, makes it possible to control the drive from either side of the drive shaft thus providing two stations of control for the benefit of the operator.

The jack shaft 36, driven subject to control of the idler or tension pulley 39 as above described, is provided with a sprocket from which a chain at 45 drives another jack shaft at 46 extending, in the manner best shown in Fig. 1, toward the feeding side of the machine. Here the shaft 46 carries another sprocket at 47 connected by chain 48 with a shaft 49 which is supported in bearings 50 carried on the under side of the bracket 19. Universally jointed coupling elements 51 and 52 (Fig. 8) have their universal joint 53 desirably disposed directly beneath the pintle 20 upon which the entire conveyor trough 21 is oscillatable between its operative and inoperative positions. The coupling member 52 has at 54 a squared socket which slidably receives the shank 55 of another coupling member 56, the latter being provided with a universally jointed connection 57 with coupling member 58.

Coupling member 58 is located at the rear end of a line shaft 60 which is supported in bearings 61 and 62 and runs lengthwise beneath the conveyor trough to the outer end thereof, where it is provided with a sprocket connected by chain 63 with the outer end of the conveyor screw 35. The outer end of the screw 35 is journaled in the outer end 29 of the conveyor trough, but the inner end of the conveyor screw floats in the trough and in the material which it is handling therein.

The kind of vehicle with which a device of this character is particularly devised to operate is usually, but not necessarily, a self-unloader and usually is a trailer such as that shown at 65 in Fig. 1. It is provided with a rearwardly opening body having a bed portion 66 and sides 67, 68, between which operates a follower 70, usually slidable on the bed and propelled rearwardly by two cables or the like 71, 72, which are connected with a windlass drum at 73 journaled at the rear of the bed and provided with squared ends 74 for an operating crank. According to the present invention, means is provided for the operation of the windlass by power.

To this end, the jack shaft 36 already described is provided at its inner end with a crank disk 75 provided with holes 76 at different radii to give a greater or less throw of the crank. A crank pin 77 adjustable selectively into one or the other of the holes 76 actuates a pitman 78 which is connected with a bell crank lever 79 pivoted at 80 to a portion of the frame 15 and carrying a pawl at 81 which is engageable with a ratchet wheel 82 mounted co-axially with the pivot 80 upon which the bell crank oscillates. The pawl 81 is provided with a spring pressed lever 83 which normally holds it in engagement with the ratchet wheel 82 but, when swung across center, may hold the pawl disengaged from the ratchet. Another pawl at 84 is pivoted to the frame and engages the ratchet to prevent the ratchet wheel from retrogressive movement.

A portion of the frame at the other side of the fan casing 10 carries another bearing at 85 for a lever 86 connected by link 87 with bell crank 79. The lever 86 and the bell crank lever 79 therefore oscillate in unison about their respective fulcrums. Mounted co-axially with lever 86 upon the fulcrum shaft 85 is a second ratchet 88 which may be selectively operated by a pawl 89 mounted on lever 86 subject to the bias of spring 90, which may be thrown across center by its control handle 91. The pawl 89 is shown disengaged while the pawl 81 is shown to be engaged in Fig. 2. Obviously, as viewed in Fig. 2, the ratchet 82 will be operated counterclockwise while the ratchet 88, if pawl 89 be engaged, will be operated clockwise.

The respective shafts 80 and 85 upon which the respective ratchets are mounted are extended outwardly and provided with squared ends and I provide detachable couplings universally jointed and axially extensible which are generically designated by reference character 95 in Fig. 1 and which are adapted selectively to connect either of the shafts 80 or 85 with the squared end 74 of the windlass shaft of any vehicle which may be even approximately aligned with the apparatus in a position to discharge its contents into the conveyor trough and hopper. By means of the eccentrically disposed apertures for the crank pin 77 (Fig. 2), I am able to operate the ratchets at any desired speed within a reasonable range. I have provided for the advance of the ratchets one tooth or two teeth or three teeth according to the crank pin location in one aperture or the other of the disk 75 on the end of jack shaft 36.

In operation, the entire conveyor trough 22 will be swung into one or the other of its positions, such as that shown in dotted lines in Fig. 1, its hopper wing 26 folding up as shown in Fig. 1 in dotted lines upon engagement with the fan housing so that the trough may be nested closely against the fan housing and parallel to the frame 15 upon which the fan housing is mounted. In this position the trough does not interfere in any manner with the driving of the vehicle to be unloaded. Since it is particularly difficult to back a trailer into position, it will obviously be a great convenience for the operator of the tractor to go in a forward direction to the point of delivery. When the trailer reaches the position shown in Fig. 1, the trough is swung from its dotted line position to its full line position in that view, so that the trough is located directly beneath the back end of the vehicle in a position to receive the contents discharged from the vehicle by the movement of the follower 70 from front to back of the bed 66 of such vehicle. For the purposes of the movement of the trough from its dotted line retracted position to its full line operative position as shown in Fig. 1, the wheels of the free end of the trough will be set transverse to the axis of the trough as shown in Fig. 1 and also in Fig. 3 and Fig. 4. Any slight inequalities of the ground surface will readily be accommodated by the vertical swinging movement of the trough since the trough is pivotal in a vertical plane about the transverse fulcrum provided at 24 by the yoke 23 by which the trough is connected to its swivel plate 24.

The fan shaft being already in operation, the operator, regardless of his station at either side of the fan casing, is able to manipulate one or the other of the handles 40 or 42 to clutch the jack shaft 36 to the fan shaft 12 by tightening the driving belts. This communicates motion through chain 45, jack shaft 46, and chain 48 to the shaft 49, from which the flexibly jointed coupling elements 51, 53, 52, 55, 56, 57, and 58, and shaft 60 lead to the forward or outer free end of the conveyor trough, where the chain 63 communicates motion to the outer end of the screw 35. When the winch drum 73 has been connected by means of the flexibly jointed shafting 95 to one or the other of the ratchet driven shafts 80 or 85 to receive motion therefrom in the appropriate direction for actuating the unloading follower 70, the motion communicated to the jack shaft 36 is made to operate the bell crank and lever system for actuating the appropriate pawl and ratchet to drive the windlass shaft and start unloading the contents of the vehicle into the trough 22, the material being guided into the trough by means of the hopper sides 25. The screw 35 is in operation to receive and advance the material into the eye of the fan which takes the material in the usual manner and discharges it pneumatically up the delivery spout 14.

If the next vehicle approaches the apparatus from the opposite direction, the trough is simply swung to the opposite side to await the positioning of the vehicle, whereupon the trough may be moved pivotally to a position behind the vehicle and the coupling to the unloading drum, in that case, will be made from the other of the ratchet driven shafts.

When my conveyor mechanism requires to be transported from one position to another, the trough 22 is simply swung to a position parallel with the frame 15 but with the wheels 31 disposed at the rear of the wheels 16 upon which the trailer frame is supported. The wheels 31 of the conveyor trough are then adjusted to the position shown in Fig. 9, whereupon the conveyor trough will trail beside the fan casing and frame 15 when the latter is propelled by a towing vehicle connected to its coupling 16a.

I claim:

1. The combination with a wheeled frame and a portable fan housing mounted thereon and provided with an inlet eye and a fan having a driving shaft, of a bracket projecting laterally adjacent said eye, a swivel plate pivoted to said bracket upon a vertical axis, a yoke mounted on the swivel plate offset from said vertical axis, a conveyor trough having a delivery end provided with a pivotal connection with the yoke upon a transverse horizontal axis, the delivery end of the trough being located adjacent the eye of said housing, wheeled means for supporting directly from the earth the free end of the trough remote from the housing; conveyor means extending longitudinally of the trough toward the eye of the housing, and driving connections from such shaft including a joint pivotally adjustable coaxially with the pivotal connection between the swivel plate and said bracket, said axis being transverse to the direction in which the trough is swingable, said connections extending longitudinally along said trough beyond said pivotal connection and being provided with driving connections to said conveyor means.

2. The device of claim 1 in which the trough is pivotally movable horizontally upon the vertical axis of the pivotal connection of said swivel plate with said bracket to positions of longitudinal alignment with the frame of said blower housing at either side of the eye of said housing, said trough being provided with hinged wings at its delivery end which are retractable away from contact with the frame when the trough is so positioned.

3. The device of claim 1 in which the wheeled support for the outer free end of the trough comprises wheels adjustable as to their plane of operation to lie either transversely of the free end of the trough or substantially parallel with the longitudinal center line of the trough, in which latter position said wheels are adapted to provide support for the free end of the trough to enable it to trail behind the frame of said housing while the latter is being transported, and means for fixing said wheels in either of said positions.

4. In a device of the character described, the combination with a blower comprising a fan shaft, a fan, and a blower housing in which said fan is operable, said housing having an inlet opening, of a bracket projecting laterally adjacent the opening, a conveyor trough having a pivotal connection upon a vertical axis with said bracket whereby said trough is horizontally pivotally movable to and from a position of lateral projection from said housing, a conveyor operating in said trough and having its inner end floating adjacent said inlet, means comprising driving means for the conveyor, a jack shaft associated with said blower housing and provided with connections driven from said fan shaft, a line shaft connected with the jack shaft and extending along said trough and connected to said driving means, said line shaft including pivot means aligned with the vertical axis upon which the trough is horizontally pivotal, a pair of driven shafts associated with said housing at each side of the inlet opening, a ratchet wheel mounted on a driven shaft, an oscillatory lever pivoted substantially coaxially with the ratchet wheel and provided with a pawl engageable therewith, and a crank provided with a link connected with said lever for the oscillation thereof, said crank being connected with said driving means to receive motion therefrom, and said driven shafts being selectively provided with flexibly adjustable connections for the operation of an unloading windlass of a vehicle to be unloaded into said trough.

5. In a device of the character described, the combination with a blower housing having an inlet, a fan, and a shaft upon which the fan is mounted, of a jack shaft, a feeding device driven therefrom, sheaves upon the fan shaft and the jack shaft, belt means operable over said sheaves, and a belt tightening pulley having a mounting upon a pair of toggle levers in pivotal connection with each other, and projecting at each side of said housing whereby said pulley may be manipulated to and from belt tightening position from either side of the housing.

6. In combination, a blower fan comprising a rotor and a housing having an inlet opening, a feed trough leading to said housing and pivotally connected therewith for movement to and from an inoperative position out of the path of vehicles to be unloaded, a conveyor mounted in the trough for delivering material to said opening, a drive shaft associated with said housing and operatively connected to the conveyor and fan rotor, a pair of driven shafts disposed at opposite sides of said trough, pawl and ratchet means for operating said driven shafts and provided with driving connections from said driving shaft, said driving connections comprising a crank disk having apertures at different radii from the axis of oscillation of the disk and a link selectively pinned to said disk in one or another of said apertures, each driven shaft having adjustable flexible coupling means for powering a self-unloading vehicle to be unloaded into said trough.

7. The combination with a blower having a housing provided with an inlet opening, of a conveyor trough having a discharge end directly feeding the blower through the opening and a pivotal connection with the blower housing adjacent such opening, the free end of the trough being movable horizontally about said pivotal connection to dispose the trough in parallel relation to the housing, said trough being provided with a folding side retractable away from contact with the housing when the trough is so positioned.

8. In a device of the character described, the combination with a blower housing wall having an inlet opening and a conveyor trough having a discharge end directly feeding the blower through the opening, of means for mounting the conveyor trough to the blower on universal pivot means whereby the conveyor trough is pivotally movable on said mounting means both horizontally and vertically, said mounting means comprising a vertical pivot on which the conveyor trough is horizontally movable, said conveyor trough being provided with motion transmitting connections to power the conveyor, said motion transmitting connections comprising a universal joint aligned on the axis of said vertical pivot.

9. The device of claim 8 in which said mounting means further comprises a yoke offset toward said housing wall from said vertical pivot and a horizontal pivot on said yoke on which the conveyor trough is vertically movable.

10. The device of claim 9 in which said mounting means further comprises a bracket connected to said housing wall and a swivel plate mounted on said bracket by means of said vertical pivot, said yoke being mounted on said swivel plate and said conveyor trough being connected by means of said horizontal pivot to the yoke whereby horizontal movement of the conveyor trough is transmitted through said yoke and swivel plate to fulcrum said movement on said vertical pivot while permitting simultaneous vertical movement of said conveyor trough on said horizontal pivot.

EARL R. GOSSE.

References Cited in the file of this patent

UNITED STATES PATENTS

| Number | Name | Date |
| --- | --- | --- |
| 1,490,404 | Ronning et al. | Apr. 15, 1924 |
| 1,589,091 | Barber | June 15, 1926 |
| 1,617,490 | Knox | Feb. 15, 1927 |
| 1,797,871 | Lippert | Mar. 24, 1931 |
| 2,005,442 | Speigl | June 18, 1935 |
| 2,340,983 | Pfeiffer et al. | Feb. 8, 1944 |
| 2,357,549 | Roberson | Sept. 5, 1944 |
| 2,373,169 | Coultas et al. | Apr. 10, 1945 |
| 2,405,695 | Hitchcock et al. | Aug. 13, 1946 |
| 2,410,501 | Huddle | Nov. 5, 1946 |

FOREIGN PATENTS

| Number | Country | Date |
| --- | --- | --- |
| 189,039 | Great Britain | Nov. 23, 1922 |